United States Patent [19]

Cox et al.

[11] Patent Number: 4,580,807
[45] Date of Patent: Apr. 8, 1986

[54] CAMBER ADJUSTMENT KIT

[76] Inventors: Francis C. Cox, Colonial House - Apt. #3, R.R. #1, Humboldt, Iowa 50548; Darryl R. Cox, 10600 Red Pine Rd., Reno, Nev. 89506

[21] Appl. No.: 679,769

[22] Filed: Dec. 10, 1984

[51] Int. Cl.$^4$ .............................................. B60P 1/00
[52] U.S. Cl. .................................................. 280/661
[58] Field of Search .............. 280/661, 660, 666, 701, 280/724

[56] References Cited

U.S. PATENT DOCUMENTS 3,751,061  8/1973  Scheuerpflug ...................... 280/661
4,236,728  12/1980  Policy et al. ........................ 280/661

FOREIGN PATENT DOCUMENTS 525880  5/1955  Italy .

*Primary Examiner*—David M. Mitchell
*Assistant Examiner*—Kenneth R. Rice
*Attorney, Agent, or Firm*—Herman H. Bains

[57] ABSTRACT

An adjustment kit for adjusting the camber angle of front wheels suspended by a twin I-beam suspension system includes a cylinder having a radial flange which supports the lower end of one of the helical springs of the suspension system. A piston is positioned in the cylinder and has a radius rod bolt secured thereto and to one of the suspension beams. The relative position of the piston and cylinder may be readily changed by increasing or decreasing the amount of grease with the cylinder to thereby change the camber angle.

1 Claim, 2 Drawing Figures

CAMBER ADJUSTMENT KIT

SUMMARY OF THE INVENTION

This invention relates to a device for adjusting the camber angle of a front end suspension system for an automotive vehicle. In the Ford Twin I-Beam Front Suspension System used in its cars and trucks, the camber and caster are machined into the parts. Presently, there is no adjustment to change these angles on front end alignment. In the event that the camber angle does not fall within the accepted specifications, the only way front end alignment shops can change the camber angle is to bend the I-beam. This procedure is deemed to be undesirable for safety reasons. It will be appreciated that the camber angle and the ride height will change in response to the addition or removal of cargo weight. If the camber angle is incorrect, the result is excessive tire wear.

It is, therefore, a general object of this invention to provide a novel bolt-in kit, of simple and inexpensive construction, which may be installed in a twin I-beam type front suspension and which is readily adjustable for selectively changing the camber angle.

A more specific object of this invention is to provide a novel bolt-in kit which is imposed between the helical spring and I-beam of a twin I-beam front suspension system and which may be readily adjusted to selectively change the camber angle.

Another object of this invention is to provide a novel bolt-in kit including a cylinder containing grease and having a piston movable therein which is positioned between the suspension I-beam and which is adjustable to change the free length of the helical spring and thereby adjust the camber angle.

These and other objects of the invention will be more specifically defined in the following specification.

DESCRIPTION OF THE PREFERRED EMBODIMENT

Figure 1:
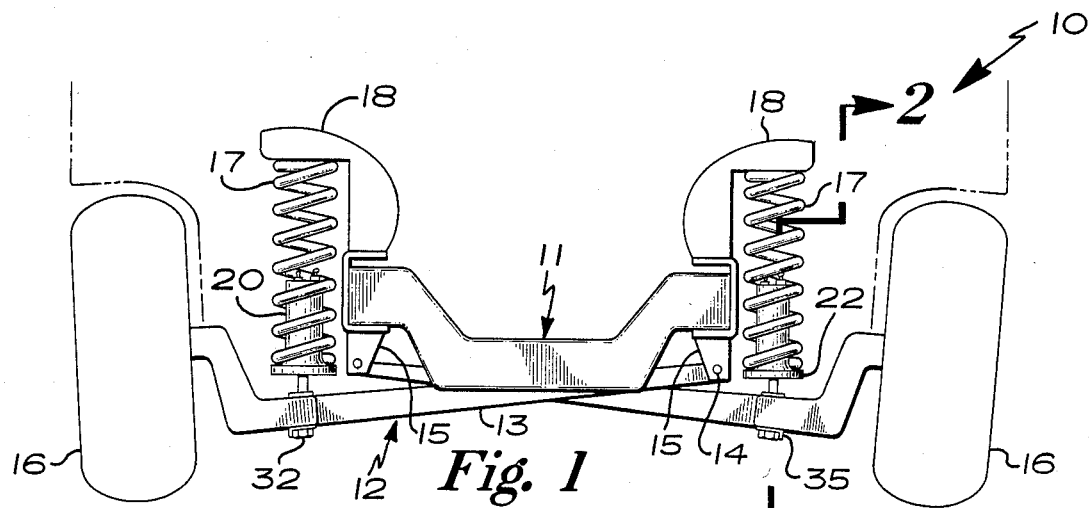
FIG. 1 is a diagrammatic front elevational view of a vehicle having a twin I-beam suspension system employing the novel bolt-in kit.
Figure 2:
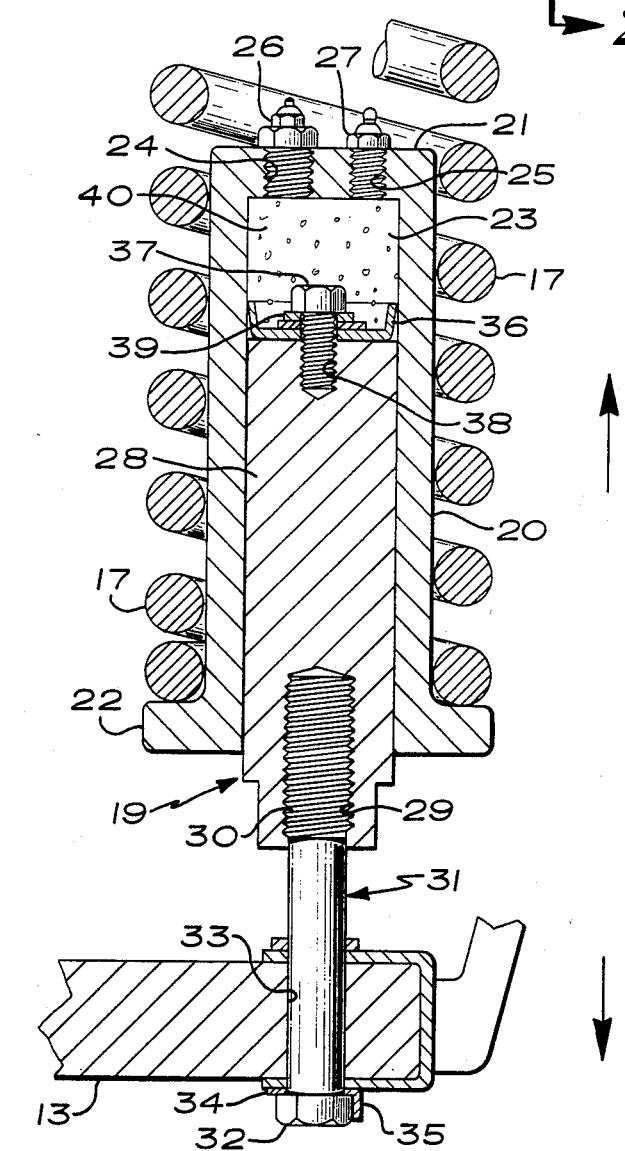
FIG. 2 is a cross-sectional view taken approximately along line 2—2 of FIG. 1 and looking in the direction of the arrows.

Referring now to the drawings and more specifically to FIG. 1, it will be seen that a conventional vehicle, designated generally by reference numeral 10, is there-shown and incorporates the novel adjustment kit therein. The vehicle 10 is diagrammatically shown and includes a frame 11 which is provided with a twin I-beam suspension system 12 for suspending the front wheels of the vehicle. The twin I-beam suspension system 12 includes a pair of elongate I-beams 13, each being pivotally connected at one end thereof by a pivot 14 to a plate 15 which is affixed to the frame 11 and depends therefrom. This permits vertical pivoting movement of each beam about a horizontal longitudinally extending axis. Each I-beam 13 suspends one of a pair of wheels 16 at the outer end thereof in a conventional well-known manner. The I-beam suspension system 12 also includes a pair of vertically disposed helical springs 17, each having its upper end bearing against one of a pair of upper spring seats 18, which are secured to the frame 11.

In the embodiment shown, a pair of the novel adjustment kits 19 are provided for the front end I-beam suspension system of the conventional vehicle, and each is interposed between the lower end portion of one of the helical springs 17 and the associated I-beam 13. In this regard, it will be seen that each adjustment kit 19 includes an elongate vertically disposed cylinder 20 having a closed upper end 21 and having an open lower end. The lower end portion of the cylinder 20 is provided with an outturned radial flange 22, and the interior of the cylinder 20 defines a chamber 23.

The upper end 21 of the cylinder is provided with a threaded opening 24 and a threaded opening 25 therethrough which communicates with the chamber 23. The threaded opening 24 accommodates an Alemite type inlet fitting 27 therein and the threaded opening 25 accommodates a relief fitting 26 therein. The inlet fitting and the outlet fitting intercommunicate the interior 23 of the cylinder 20 with the exterior.

An elongate cylindrical piston 28 is positioned in the cylinder 20 and is movable therein. It will be noted that the piston 28 has an axial or longitudinal dimension slightly less than the interior axial dimension of the cylinder 20. It will be seen that the lower end portion of the piston 28 projects exteriorly of the cylinder 20 and has a downwardly facing threaded opening 29 therein. The threaded opening 29 accommodates the threaded shank portion 30 of a radius rod bolt 31 having a hex head 32. The radius rod bolt 31 is different than the conventional I-beam radius rod bolt, but projects through the conventional opening 33 in the I-beam 13. A lock plate 34 having a bent flange 35 locks the bolt 31 against rotation. In this regard, the bent flange 35 engages one of the faces of the hex head 32 of the radius rod bolt.

The upper end of the piston 28 has a leather cup 36 secured thereto by a bolt 37 that engages in the threaded opening 38 in the piston 28. A flat washer and lock washer assembly 39 are interposed between the cup 36 and the bolt head to releasably lock the bolt 37 against rotation. The chamber 23 of the cylinder is adapted to contain a conventional grease therein which is introduced into the chamber through the conventional Alemite type inlet fitting 27. The relief fitting 26 is adapted to permit grease to be bled from the chamber when a pressure of predetermined magnitude is reached.

In use, a pair of the novel adjustment kits 19 will be used to adjust the camber angle of the front wheels in the event that the camber angle is not correct. For example, if the twin I-beam suspension 12 is incorporated on a conventional pickup truck, additional cargo weight, which exceeds a predetermined amount, will change the camber angle of the front wheels and the ride height. When the camber angle is not correct, the result is excessive tire wear. Typically, the front end alignment shops attempt to bend the I-beams 13 to correct the camber angle. This practice is not only discouraged, but the procedure is ineffective for correcting the camber angle.

With the novel adjustment kit 19, the camber angle can be corrected without requiring any substantial modification of the front end parts. For example, the only modification to the front end is the elimination of the lower spring seat and the use of the radius rod bolt 31 for the conventional radius rod bolt.

It will be seen that the helical spring 17 rests upon the radial flange 22 of the cylinder 20 of each kit, rather than engaging the lower spring seat of the twin I-beam front end suspension system. Grease may be added to the chamber 23 through the inlet fitting 27, which, in effect, changes the free length of the associated helical spring 17. As the grease is increased, the cylinder 20 is moved upwardly relative to the piston 28, thereby increasing free length of the spring 17. This movement also changes the camber angle of the front wheels 16. Once the correct camber angle is achieved, the grease 23 in the chamber is non-compressible and simply will prevent additional relative movement between the piston and cylinder. In the event that the user finds it necessary to readjust the camber angle because of the removal or addition of additional cargo, it is only necessary to connect the flexible tube of a grease gun to the inlet fitting 26 and add additional grease, or, alternatively, to permit grease to be bled through the relief fitting 26.

The adjustment kit, therefore, permits a substantially wide range of adjustment in correcting the camber angle of the front wheels and this can readily be accomplished with a minimum of effort and with a minimum of time.

Thus, it will be seen that I have provided a novel adjustment kit, which is not only of simple and inexpensive construction, but one which functions in a more efficient manner in the correcting camber angle for front end suspensions than any heretofore known comparable device.

What is claimed is:

1. A kit for vehicles for use in adjusting the camber angle on a front end suspension system thereof including a pair of suspension beams pivotally connected to the frame and each beam suspending a front wheel therefrom, and a pair of vertically disposed helical springs, each engaging the frame and the upper surface of one of the suspension beams, comprising:
   a vertically disposed cylinder positioned interiorly of one of the helical springs and having a closed upper end and an open lower end, said cylinder containing a predetermined amount of grease, a radial flange on the lower end of said piston extending outwardly therefrom and engaging the lower end of one of the helical springs for supporting the latter,
   a piston in said cylinder, said piston and cylinder being axially shiftable relative to each other,
   a bolt connected to said piston and extending downwardly therefrom and being connected to one of the beams,
   an inlet fitting on the closed end of said cylinder communicating the interior thereof to permit grease to be introduced into said cylinder, and a relief fitting on the closed end of said cylinder to permit grease to be bled from said cylinder when the pressure exerted by the grease within the cylinder exceeds a predetermined magnitude, whereby, when grease is introduced into or removed from said cylinder, the piston and cylinder will be adjusted axially relative to each other to vary the free length of the helical spring and change the camber angle of the vehicle wheel.

* * * * *